US012300830B2

(12) United States Patent
Gündogan et al.

(10) Patent No.: US 12,300,830 B2
(45) Date of Patent: May 13, 2025

(54) FRAME STRUCTURAL PART AND BATTERY HOUSING WITH A FRAME STRUCTURE COMPOSED OF SUCH FRAME STRUCTURAL PARTS

(71) Applicant: Kirchhoff Automotive Deutschland GmbH, Attendorn (DE)

(72) Inventors: Aydogan Gündogan, Plettenberg (DE); Alexander Schauerte, Kirchhundem (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 578 days.

(21) Appl. No.: 17/636,959

(22) PCT Filed: Sep. 7, 2020

(86) PCT No.: PCT/EP2020/074945
§ 371 (c)(1),
(2) Date: Feb. 21, 2022

(87) PCT Pub. No.: WO2021/048051
PCT Pub. Date: Mar. 18, 2021

(65) Prior Publication Data
US 2022/0278400 A1 Sep. 1, 2022

(30) Foreign Application Priority Data
Sep. 9, 2019 (DE) ............ 10 2019 124 055.7

(51) Int. Cl.
*H01M 50/184* (2021.01)
*H01M 50/119* (2021.01)
(Continued)

(52) U.S. Cl.
CPC ....... *H01M 50/184* (2021.01); *H01M 50/119* (2021.01); *H01M 50/171* (2021.01);
(Continued)

(58) Field of Classification Search
CPC ............ H01M 50/184; H01M 50/249; H01M 50/186; H01M 50/198; H01M 50/119; H01M 50/171
(Continued)

(56) References Cited

U.S. PATENT DOCUMENTS

| 10,424,770 B2 | 9/2019 | Gunther |
| 10,723,234 B2 | 7/2020 | Gunther |

(Continued)

FOREIGN PATENT DOCUMENTS

| DE | 2753289 A1 | 5/1979 |
| DE | 102012100977 B3 | 7/2013 |

(Continued)

OTHER PUBLICATIONS

International Search Report dated Mar. 18, 2021 in parent International application PCT/EP2020/074945.

(Continued)

*Primary Examiner* — Christian Roldan
*Assistant Examiner* — Robert Gene West
(74) *Attorney, Agent, or Firm* — Polson Intellectual Property Law P.C.; Margaret Polson; Christopher Sylvain

(57) ABSTRACT

A frame structure part for forming a frame structure for a battery housing of an electric motor vehicle with at least two hollow chamber profiles, which are connected to one another at an angle and each have at least two chambers and a mounting surface extending in the x-y plane and located on the upper side of the profiles in a common plane. A sealing fillet following the longitudinal extension of the profiles is introduced into the mounting surface for receiving a seal, wherein the ends of both profiles are mitered in a first profile section extending from the mounting surface over the entire extension of the uppermost chamber in the z-direction, and the miter joints are connected to one another, so that the (Continued)

joint-end mouths of the fillets of the two profiles adjoin one another. The first profile, in a second profile section located in the z-direction below the first profile section adjoining the same, bears with its end face against a side face of the second profile and is connected thereto. Also described is a battery housing with a frame structure having a plurality of such frame structure parts.

19 Claims, 2 Drawing Sheets

(51) Int. Cl.
  *H01M 50/171* (2021.01)
  *H01M 50/186* (2021.01)
  *H01M 50/198* (2021.01)
  *H01M 50/20* (2021.01)
  *H01M 50/249* (2021.01)

(52) U.S. Cl.
  CPC ....... *H01M 50/186* (2021.01); *H01M 50/198* (2021.01); *H01M 50/249* (2021.01)

(58) Field of Classification Search
  USPC .......................................................... 429/122
  See application file for complete search history.

(56) References Cited

U.S. PATENT DOCUMENTS

| | | | |
|---|---|---|---|
| 10,763,472 B2 | 9/2020 | Gunther et al. | |
| 10,843,577 B2 | 11/2020 | Gunther et al. | |
| 10,985,422 B2 | 4/2021 | Gunther et al. | |
| 11,075,416 B2 | 7/2021 | Günther | |
| 11,108,112 B2 | 8/2021 | Gunther et al. | |
| 11,205,816 B2 | 12/2021 | Gunther | |
| 2011/0143179 A1 | 6/2011 | Nakamori | |
| 2018/0361875 A1* | 12/2018 | Ruech | B60K 1/04 |
| 2020/0130516 A1* | 4/2020 | Schwarz | B60L 50/64 |
| 2020/0295322 A1 | 9/2020 | Gunther | |
| 2021/0143497 A1 | 5/2021 | Günther | |
| 2021/0265690 A1 | 8/2021 | Günther | |
| 2021/0384581 A1 | 12/2021 | Gundogan et al. | |
| 2022/0278415 A1 | 9/2022 | Günther | |
| 2022/0294071 A1 | 9/2022 | Günther | |
| 2023/0006297 A1 | 1/2023 | Günther | |

FOREIGN PATENT DOCUMENTS

| | | |
|---|---|---|
| DE | 102016114839 A1 | 2/2018 |
| DE | 102016115611 B3 | 2/2018 |
| DE | 102017117093 A1 | 1/2019 |
| EP | 3399571 A1 | 11/2019 |
| WO | 2021048051 A1 | 3/2021 |
| WO | 2021048053 A1 | 3/2021 |

OTHER PUBLICATIONS

Written Opinion of the International Searching Authority dated Mar. 18, 2021 in parent International application PCT/EP2020/074945. NOTE: Machine translation provided. Consult official WIPO translation if unclear.
Examination Report dated Jun. 24, 2020 in related German application DE 10 2019 124 055.7. Machine translation provided.
Examination report dated Jul. 1, 2023 in related Chinese application No. 202080062681.8.

* cited by examiner

FRAME STRUCTURAL PART AND BATTERY HOUSING WITH A FRAME STRUCTURE COMPOSED OF SUCH FRAME STRUCTURAL PARTS

BACKGROUND

The present disclosure relates to a frame structure part of a frame structure of a battery housing of an electric motor-driven motor vehicle with at least two hollow chamber profiles connected to each other at an angle, each profile with at least two chambers arranged one above the other in the z-direction, and a mounting surface extending in the x-y plane on the upper side of the hollow chamber profiles in a common plane.

In electric motor-driven motor vehicles, such as passenger cars, industrial trucks or the like, battery modules are used as energy storage devices. Such battery modules are typically composed of a large number of individual battery cells. These batteries are typically so-called high-voltage batteries. High demands are placed on the accommodation of such battery modules, which are necessary for the operation of such a vehicle. It is essential that the battery modules in their battery housing are adequately protected against crash-related force inputs in order to meet the required safety standards. In addition, the legal requirements call for the battery housing to be sealed from the environment.

DE 10 2016 115 611 B3 discloses a battery housing in which the battery housing has a circumferential frame structure, a base and a cover. In this battery housing, the frame structure enclosing a battery module receptacle is formed by bending a hollow profile by 90° to form a corner. This achieves the required tightness in the edge area of the frame structure, since this corner or edge area has not been joined but produced as a single piece by bending.

From US 2011/0143179 A1, a further battery housing is known in which, in order to provide mechanical protection, in particular for the battery module or modules accommodated therein, a tray part is enclosed by a frame structure, which frame structure is formed from individual profile sections assembled to form a frame profile. Extruded light metal hollow chamber profiles, typically aluminum extrusions, are used as profile sections to save weight. Due to the open-ended hollow chamber profiles, this battery housing requires frame structural parts arranged at right angles to each other to be provided with an end piece to close the end openings of the hollow chamber profiles in order to achieve the required level of tightness and stability. This end machining is as costly as it is complex. The connection of two arranged hollow chamber profiles known from this document, in which one hollow chamber profile is supported with its end face against a side wall of the other hollow chamber profile, is favorable for the desired crashworthiness of such a frame structure. Another battery housing of this type is known from DE 10 2026 115 611 B3.

DE 27 53 289 A discloses a window frame consisting of mitered frame members provided with mini tines on the mitered surfaces and glued together as a prior art product.

In principle, it is also known for frame structures or frame structure parts as part of a battery housing to form welded corner joints of hollow chamber profiles as miter joints. However, such frame structures have only limited crashworthiness, since side impact forces acting on the structure are introduced directly into the welded joint connecting the miter joints as shear forces.

The circumferential mounting surface of a frame structure composed of such frame structure parts is used for mounting a cover, which carries a circumferential complementary mounting flange for this purpose. A seal is placed between the perimeter mounting surface of the frame structure and that of the cover to provide the required tightness between the cover and the tray. The seal clamped between the mounting flange of the cover and the mounting surface of the frame structure. This means that the cover is supported and braced against the seal located on the mounting surface of the frame structure. This distortion can cause swelling of the cover's mounting flange if the mechanical fasteners used to secure the cover to the frame structure are spaced too far apart. This can lead to leaks. In addition, there is a risk that the required fasteners will be tensioned to different degrees, which will also result in leaks at the interface between the cover and the frame structure.

SUMMARY

Proceeding from this background, an aspect of the present disclosure is therefore to provide a frame structure part for forming a frame structure for a battery housing of an electric motor-driven vehicle, which is not only simple and inexpensive to manufacture, but is also characterized by a secure seal of the cover with respect to the frame structure and a crash performance that meets the requirements.

This achieved by a generic frame structure part of the type mentioned at the beginning, wherein a sealing fillet following the longitudinal extension of the hollow chamber profiles is introduced into the mounting surface for receiving a seal, wherein the ends of both hollow chamber profiles are mitered in a first profile section extending from the mounting surface over the extension of the uppermost chamber in the z-direction, and the miter joints are connected to one another, so that the joint-end openings of the sealing fillets of the two hollow chamber profiles adjoin one another, and wherein the first hollow chamber profile, in a second profile section located in the z-direction below the first profile section and adjoining the first profile section, bears with its end face against a side face of the second hollow chamber profile and is connected thereto.

Such a frame structural part typically comprises two hollow chamber profiles joined at an angle, for example to form a corner with an included angle of 90°. It is understood that other angles can also be enclosed by the two hollow chamber profiles. The hollow chamber profiles have at least two chambers arranged one above the other in the z-direction and a mounting surface extending in the x-y plane and arranged on the upper side of the hollow chamber profiles. It is understood that to form a perimeter frame structure for a battery housing, a plurality of frame structure parts, typically two frame structure parts each formed from two hollow chamber profiles, are joined together. To realize a fluid-tight seal between a cover and the circumferential mounting surface of the frame structure, the mounting surface of the hollow chamber profiles has a sealing fillet following its longitudinal extension. The sealing fillet may also be referred to as a sealing channel or groove. The sealing fillet is typically located at a distance from the boundary of the mounting surface facing the battery volume. According to a preferred embodiment, the sealing fillet of the hollow chamber profiles is located in the area of the outer edge of the mounting surface opposite the battery volume. In such an embodiment, the sealing fillet is open to the outside of the hollow chamber profile. According to one embodiment, the sealing fillet has a rounded cross-sectional geometry. To seal the cover of such a battery housing against the frame structure, a seal is inserted into the sealing fillet, which is circumferential with respect to the frame structure. The sealing fillet not only provides a relatively large contact area between the seal and the mounting surface. Of particular advantage is that the cover can be positioned or braced with its mounting flange contacting the mounting surface of the frame structure. This ensures a circumferentially uniform bracing or arrangement of the mounting flange of the cover relative to the mounting surface of the frame structure, wherein the seal is positioned in the sealing fillet and placed under preload between these two parts. The possibility of a contacting arrangement of the mounting flange of the cover on the mounting surface of the frame structure formed from the frame structure parts allows the cover to be joined to the frame structure with a material-to-material bond, for example by spot welding, if desired. At the same time, electrical contacting is provided by such a contacting arrangement of the mounting flange of the cover to the mounting surfaces of the frame structure. Sealing compounds can also be used as seals, typically those that are curable. It is then possible to bond the cover to the frame structure by the sealant placed in the sealing fillet.

In order to obtain a continuous sealing fillet in the case of two adjoining hollow chamber profiles for the formation of a frame structure part, which hollow chamber profiles are typically manufactured as extruded sections, the two hollow chamber profiles joined together at an angle are mitered only in the region of their uppermost section forming the respective mounting surface. This uppermost section will typically be sized to extend only over the uppermost chamber of the hollow chamber profiles. This is preferably separated from the chamber below it in the z-direction by a web running in the x-y plane. Due to this miter cut, the joint-end openings of the two sealing fillets adjoin each other or merge into each other when the miter joints of the two frame structure parts adjoin each other or are connected to each other. The joint-end openings may also be referred to as joint-side openings or mouths.

The remaining profile sections of the two hollow chamber profiles to be joined or connected, on the other hand, are not mitered, at least not in the case of both hollow chamber profiles. If the angle enclosed by the two hollow chamber profiles to form a frame structure part is not to be 90°, the end faces provided on one hollow chamber profile for abutment against the side wall of the other hollow chamber profile are mitered to match the angle provided. In this profile section of the hollow chamber profile, the end face of one hollow chamber profile rests against a side face of the other hollow chamber profile and is joined to this hollow chamber profile, typically by material bonding, for example by welding. This hollow chamber profile section achieves the desired crash performance of a frame structure formed from such frame structure parts. In this respect, such a frame structure part combines the advantages of a corner formation by miter joint with the advantages of an end face of a second hollow chamber profile abutting a side wall of a first hollow chamber profile in terms of crash performance. At the same time, the formation of the uppermost section of the hollow chamber profile with a miter joint allows sealing fillets to be formed in the mounting surfaces of the hollow chamber profiles and the sealing fillets of two interconnected hollow chamber profiles to adjoin and thus merge into one another.

To round off the inner corner formed in this way at the transition of the sealing fillet of a first hollow chamber profile into that of a second hollow chamber profile, this can be appropriately reworked (rounded off) in a subsequent step, for example by milling.

A particular advantage of this concept is that the miter joint only has to extend over a short distance in the z-direction. Thus, depending on the design of the hollow chamber profile and its extension in the z-direction, the larger portion of the hollow chamber profile in its extension in the z-direction can be used to form the joints that are favorable for crash performance and are supported on a side wall of the other hollow chamber profile.

In one embodiment, to form a frame structure for a battery housing, a supporting leg is formed on the hollow chamber profiles in their lower section. This extends in the direction of the battery volume to be accommodated. In a front side view, such a hollow chamber profile is L-shaped. This supporting leg is also preferably designed as a hollow single- or multi-chamber profile leg. The supporting legs of two hollow chamber profiles arranged at an angle to each other and connected to each other, as part of the lower section of the hollow chamber profile already described above, adjoin a side face of the supporting leg of the other hollow chamber profile with the end face of one supporting leg. Thus, the supporting legs also help to improve crash performance.

In a frame structure built up from such frame structure parts, the supporting legs serve to support battery modules to be accommodated in the battery volume or also to support a base plate on which the battery module or modules are then arranged.

In a further development of such a frame structure part with supporting legs formed on the hollow chamber profiles, a shoulder projecting into the space enclosed by the hollow chamber profile and the supporting leg formed thereon is formed on the hollow chamber profile and/or the supporting leg. Typically, the shoulder is formed on both the hollow chamber profile and the supporting leg, i.e. it is located in the corner formation formed by these two profile components. The design of the hollow chamber profile is stepped by the shoulder. Also, the shoulder, which is typically also a hollow chamber, of one hollow chamber profile abuts and is connected to the side surface of the shoulder of the other hollow chamber profile. Thus, in such an embodiment, there are several support joints located in different planes and spaced apart from each other, i.e. joints in which a section of a first hollow chamber profile is supported with its end face against a side face of a second hollow chamber profile. These offset joints contribute in a special way to optimizing the crash performance of a battery housing frame structure formed from such hollow chamber profiles.

The shoulder is used for placing a base plate, wherein this is connected to the upper side of the shoulder in a fluid-tight manner, for example by bonding. The advantage of this embodiment is that the sections of the interconnected hollow chamber profiles located below the base plate do not necessarily have to be joined with a sealing weld seam, and the sections of the second hollow chamber profile that are open at the end face do not have to be closed at the end face. This results in simpler production as well as weight and cost savings.

In a weight-optimized embodiment of this frame structure part, the hollow chamber profiles are designed as extruded aluminum profiles.

In a further embodiment, it is provided that a cover positioning extension is formed on the mounting surface, projecting orthogonally therefrom. The cover positioning extension is an extension suitable for positioning a cover to be placed on the mounting surface with its mounting flange, i.e. that the cover positioning extension engages at least somewhat in the interior of the cover. The cover positioning extension is typically located in extension of the inner wall of the hollow chamber profile. The provision of a cover positioning extension has the further advantage that a fillet is formed by it with the mounting surface, which in turn can be used to arrange a further seal. In an embodiment in which the inside of the cover is aligned with the inside of the hollow chamber profile, the transition between the cover sidewall and its mounting flange is a fillet disposed around the cover positioning extension, spaced a small distance apart to provide sufficient space to accommodate a seal. The preload force acting on a seal inserted in this fillet acts in the same way as described with respect to the seal located in the circumferential sealing fillet by supporting the mounting flange of the cover on the mounting surface of the frame structure. Thus, in the case of a battery housing designed in this way, not only is care taken to ensure a positionally accurate arrangement of the cover on the frame structure and equal circumferential bracing due to the contacting support of the mounting flange of the cover on the mounting surface of the frame structure, but the possibility of installing two circumferential seals spaced apart from each other is also provided, which ensures a high degree of tightness. Particularly if bonding of the cover to the frame structure via the seal is provided, special holding forces are achieved by these two seals arranged at a distance from each other. In this context, it should not be overlooked that the profile sections located below the miter cut ensure optimum crash performance.

In the hollow chamber profile, at least the upper chamber is preferably separated from the chamber below by a web extending in the x-y plane. This makes it easy to limit the miter joint in the z-direction. Even though the chambering in the other sections of the hollow chamber profile can be made by webs with a different spatial position, to further optimize crash performance, the chambering in this respect will also be made by webs running in the x-y plane and/or in the z-x plane.

The directions used in the context of these explanations, the x-direction, the y-direction and the z-direction, are as follows: The x-direction corresponds to the longitudinal extension of a hollow chamber profile. The y-direction is the transverse direction to the x-direction. The z-direction is the direction of the vertical axis, which is therefore perpendicular to the x-y plane.

BRIEF DESCRIPTION OF THE DRAWINGS

The present disclosure is described below with reference to the accompanying figures by way of an exemplary embodiment, wherein.

DETAILED DESCRIPTION

Figure 1:
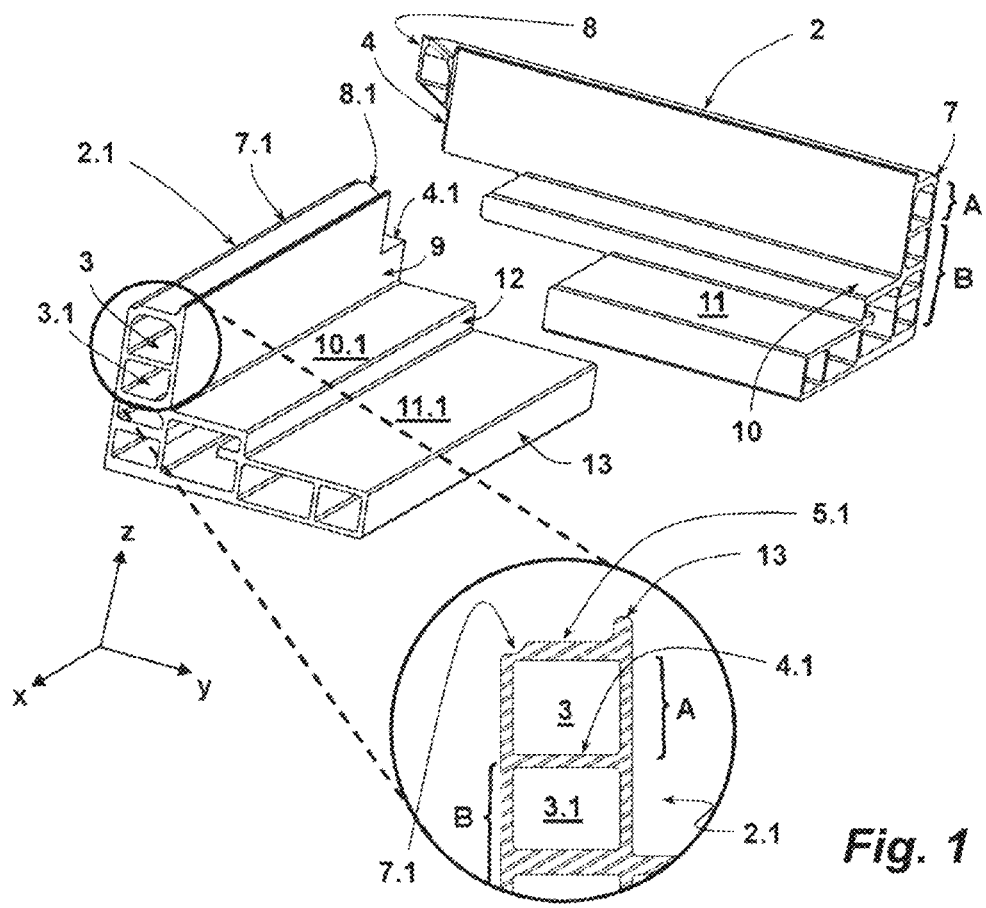
FIG. 1 shows a perspective view of two hollow chamber profiles for manufacturing a frame structure part before their assembly.

FIG. 1 shows two hollow chamber profiles 2, 2.1 to be joined together at an angle to form a frame structural part. Only one end section of the two hollow chamber profiles 2, 2.1 is shown in FIG. 1. Both hollow chamber profiles 2, 2.1 have several chambers arranged one above the other in the z-direction, of which only the two uppermost chambers are identified by the reference signs 3, 3.1 (see detailed drawing of FIG. 1). In the embodiment shown, the hollow chamber profiles 2, 2.1 have a total of four hollow chambers arranged one above the other. The chambers and in particular chambers 3, 3.1 are each separated from one another by a web 4, 4.1 extending at right angles to the side walls of the hollow chamber profiles 2, 2.1 extending in the z direction. Both hollow chamber profiles 2, 2.1 have a mounting surface 5, 5.1 on their upper side. In the embodiment shown, this extends in the x-y plane. The mounting surfaces 5, 5.1 serve as a contact surface for connecting the circumferential mounting flange of a cover 6 (see FIG. 3) when the frame structure part $R_1$ formed from the hollow chamber profiles 2, 2.1 is assembled with a further frame structure part $R_2$ to form a frame structure $R_S$ (see FIG. 2). A sealing fillet 7, 7.1 following the longitudinal extension of the hollow chamber profiles 2, 2.1 is provided in the mounting surfaces 5, 5.1 to accommodate a seal. The sealing fillets 7, 7.1 are located in extension of the hollow chamber profile outer walls and, as can be seen from the detailed representation of FIG. 1, represent a recess with a rounded cross-sectional geometry relative to the surface of the mounting surfaces 5, 5.1. The sealing fillets 7, 7.1 are open towards the outside.

The connection concept according to which the two hollow chamber profiles 2, 2.1 are assembled with each other to form a frame structure part $R_1$, $R_2$ is described below on the basis of the upper section of the hollow chamber profiles 2, 2.1 with their chambers 3, 3.1.

The hollow chamber profiles 2, 2.1 are mitered in the area of their uppermost section A. This uppermost profile section extends over the chamber 3 and part of the material thickness of the web 4. The miter joints formed in this way in the hollow chamber profiles 2, 2.1 are identified by the reference signs 8, 8.1. The miter cuts for forming the miter joints 8, 8.1 extend over the entire transverse extent of the profile in the profile section A. The miter joints 8, 8.1 serve the purpose of ensuring that the hollow chamber profiles 2, 2.1 adjoin each other with the end face openings of their sealing fillets 7, 7.1, in order to obtain a continuous sealing fillet from the mounting surface 5 of the hollow chamber profile 2 into the mounting surface 5.1 of the hollow chamber profile 2.1.

In the profile section B located below the profile section A, the two hollow chamber profiles 2, 2.1 are not connected to each other at the end faces with complementary miter joints. In this profile section B, the end face of a first hollow chamber profile (here: the hollow chamber profile 2), which is not mitered in the embodiment example shown, adjoins the side wall 9 of the profile section B of the other hollow chamber profile (here: the hollow chamber profile 2.1). As a result of the miter cut being made to form the miter joints 8, 8.1, including only part of the material thickness of the web 4, 4.1, the chamber 3.1 located below the chamber 3 remains closed at the top (see FIG. 1).

In the embodiment shown, a supporting leg 11, 11.1 having a shoulder 10, 10.1 is formed on each of the hollow chamber profiles 2, 2.1. The supporting legs 11, 11.1 are also designed as hollow chamber profile sections, wherein the chambering is formed by webs running in the x-z plane. The supporting legs 11, 11.1 are formed on the wall 9 of the hollow chamber profiles 2, 2.1 facing inwards in the case of the frame structure part $R_1$, $R_2$. The supporting legs 11, 11.1 form with their shoulder 10, 10.1 a support for positioning a base plate.

To enable the connection of the hollow chamber profile 2 with its end face to the hollow chamber profile 2.1 in the area of the supporting legs 11, 11.1 carrying the shoulders 10, 10.1, parts of its shoulder 10 and its supporting leg 11 are notched in the hollow chamber profile 2. This allows the end faces formed in this way to come into full contact with the side walls 12, 13 of the shoulder 10.1 or the supporting leg 11.1. Thus, the hollow chamber profile 2 is supported at its end face over its entire surface in its profile section B against one side wall 9, 12, 13 of the hollow chamber profile 2.1 in each case.

Figure 2:
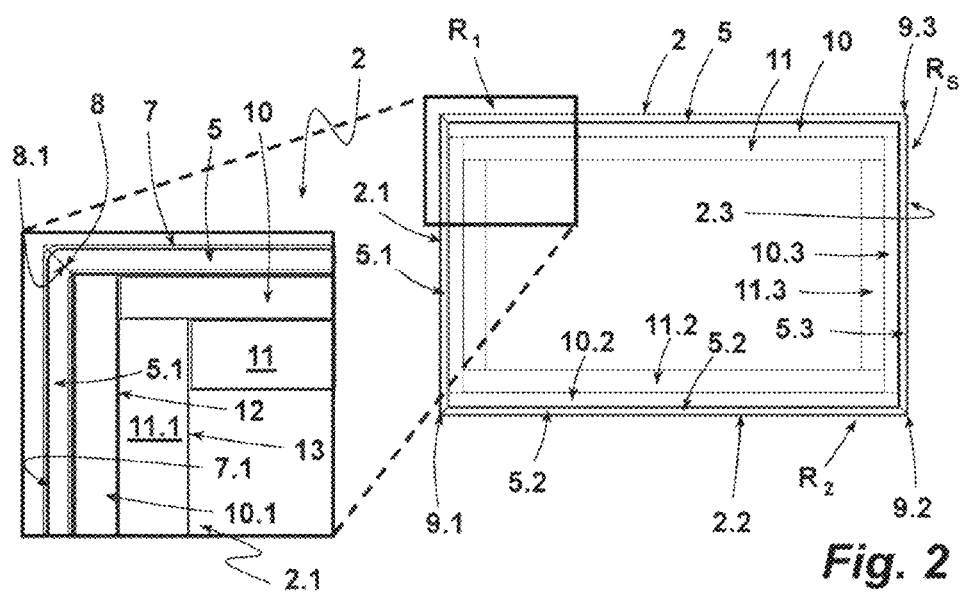
FIG. 2 shows a top view of a lower part of a battery housing composed of two frame structure parts.

FIG. 2 shows a plan view of a frame structure $R_S$ formed from two frame structure parts $R_1$, $R_2$, in which the respective adjacent hollow chamber profiles 2, 2.1 and the remaining hollow chamber profiles 2.2, 2.3 of the frame structure $R_S$ are adjacent to one another to form the corner. The corner formation of the frame structure $R_S$ provided by the assembled hollow chamber profiles 2, 2.1 can be seen in the detail enlargement. The adjacent miter joints 8, 8.1 can be seen therein, as can the flat abutment of the end faces of the hollow chamber profile 2 against the side walls of the hollow chamber profile 2.1, wherein only the abutment against the side walls 12 and 13 of the shoulder 10.1 and the supporting leg 11.1, respectively, can be seen. The attachment on the side wall 9 is not visible, as it is located below the mounting surface 5.

As can be seen from the detailed enlargement of this figure, the edge of the sealing fillets 7, 7.1 pointing in the direction of the angle enclosed by the two hollow chamber profiles 2, 2.1 is rounded in the transition area. In the embodiment shown, this has been formed by an additional machining process. This filleting can be done after cutting the profile sections A to miter before joining the two hollow chamber profiles 2, 2.1.

As can be seen in FIG. 1, the hollow chamber profiles 2, 2.1, 2.2, 2.3 each have a cover positioning extension 14 projecting from the mounting surface 5, 5.1. The cover positioning extensions 14 extend in alignment with the side wall 9 and are used to position a cover 6 to be connected to the frame structure $R_S$.

Figure 3:
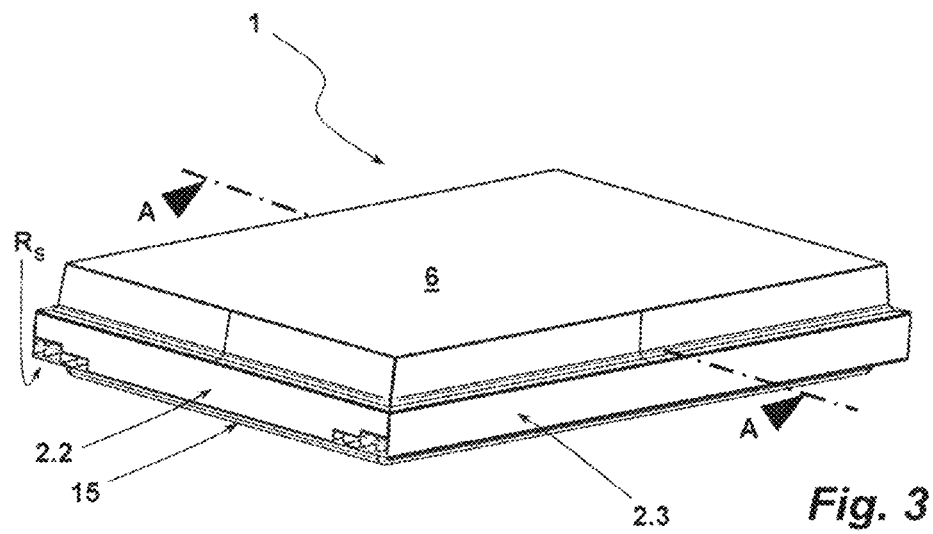
FIG. 3 shows a perspective view of a battery housing with a base tray attached to the underside of the frame structure and a cover attached to the frame structure.
Figure 4:
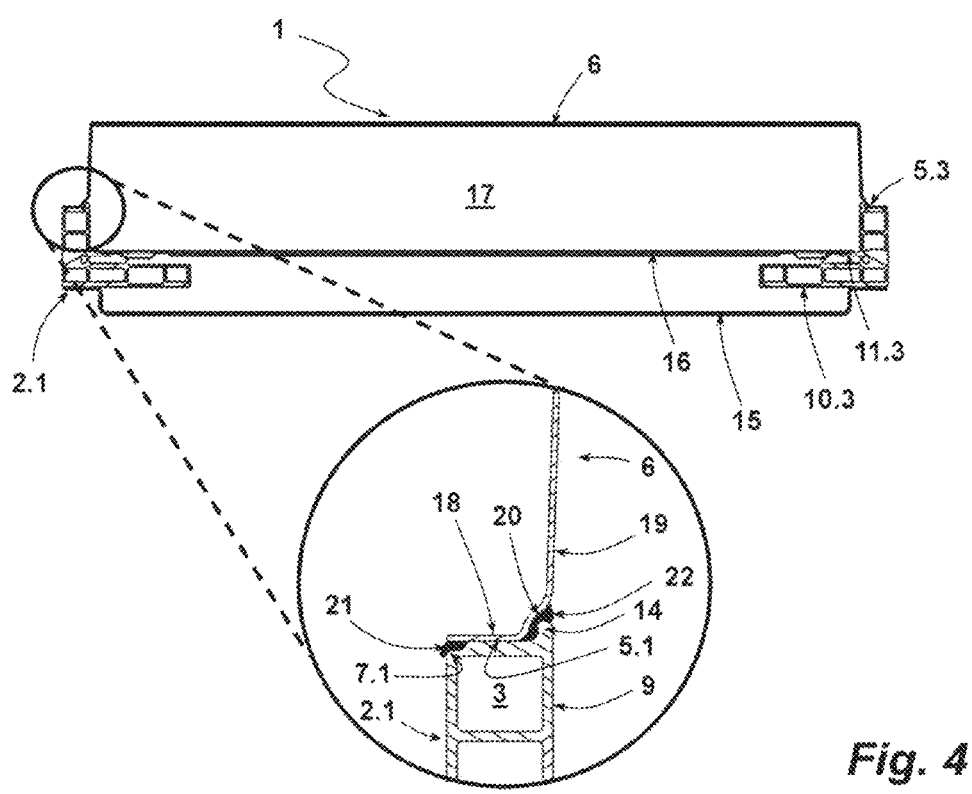
FIG. 4 shows a sectional view through the battery housing taken along the line A-A of FIG. 3 with an enlarged detail view.

FIG. 3 shows a perspective view of a battery housing 1 with the frame structure $R_S$ described above, formed by the frame structure parts $R_1$, $R_2$. A base tray 15 (see also FIG. 4) is connected to the underside of the frame structure $R_S$. On the upper side, the cover 6 is attached to the frame structure $R_S$. From the sectional view of FIG. 4, it can be seen that a base plate 16 rests on the shoulders 10, 10.1, 10.2, 10.3. The base plate 16 is fluid-tightly connected to the top of the shoulders 10, 10.1, 10.2, 10.3, for example by means of an adhesive connection. The battery module or modules to be accommodated in the battery housing 1 are placed on the base plate 16. Due to the sealed connection of the base plate 16 to the tops of the shoulder 10, 10.1, 10.2, 10.3, the battery volume 17 is sealed at the bottom. This has the advantage that the welded joints below the base plate 16, with which the individual hollow chamber profiles 2, 2.1, 2.2, 2.3 are joined together at the end faces, do not necessarily have to be tight. This simplifies the welding process.

The cover 6 carries a circumferential, outwardly projecting mounting flange 18 on its underside, by means of which it rests on the upper side of the mounting surfaces 5, 5.1, 5.2, 5.3. The transition of the cover 6 from its side wall 19 into the mounting flange 18 is executed with the formation of a sealing fillet 20. The sealing fillet 20 is spaced a small distance around the cover positioning extension 14 so that the inside of the side wall 19 of the cover 6 is aligned with the side wall 9 of the hollow chamber profile 2.1.

To seal the cover 6 or its mounting flange 18 with respect to the upper side of the frame structure $R_S$, a seal 21, in the case of the embodiment shown a curable sealing compound, is inserted into the sealing fillets 7, 7.1, 7.2, 7.3 before the cover 6 is mounted. Similarly, a seal 22, in the illustrated embodiment also realized by a curable sealing compound, is also introduced into the fillet formed by the cover positioning extension 14 and the mounting surfaces 5, 5.1, 5.2, 5.3. By subsequent placement of the cover 6 with its circumferential mounting flange 18 on the mounting surfaces 5, 5.1, 5.2, 5.3, the not yet cured sealing compound completely fills the cavities formed by the sealing fillets 7, 7.1, 7.2, 7.3 and the space between the sealing fillet 20 of the cover 6 and the cover positioning extension 14. A special feature is that the sealing fillets 7, 7.1, 7.2, 7.3 as well as 20 are laterally open so that excess sealing compound is pressed out of this opening when the cover 6 with its mounting flange 18 is placed in position and thus electrically conductive contact between the mounting flange 18 and the frame structure $R_S$ is not impaired. In the embodiment shown, the sealant also serves an adhesive connection between the cover 6 and the frame structure $R_S$.

The invention has been described by means of of an example embodiment with reference to the figures. Without departing from the scope of the claims, there are further embodiments and possibilities for a person skilled in the art to implement the invention, without these having to be explained or shown in more detail within the context of this disclosure.

LIST OF REFERENCE SIGNS

1 Battery housing
2, 2.1-2.3 Hollow chamber profile
3, 3.1-3.3 Chamber
4, 4.1 Web
5, 5.1-5.3 Mounting surface
6 Cover
7, 7.1-7.3 Sealing fillet
8, 8.1-8.3 Miter joint
9 Side wall
10, 10.1-10.3 Shoulder
11, 11.1-11.3 Supporting leg
12 Side wall
13 Side wall
14 Cover positioning extension
15 Base tray
16 Base plate
17 Battery volume
18 Mounting flange
19 Side wall
20 Sealing fillet
21 Seal
22 Seal
A Profile section
B Profile section
$R_1$, $R_2$ Frame structure part
$R_S$ Frame structure

The invention claimed is:

1. A frame structure part of a frame structure of a battery housing of an electric motor-driven motor vehicle, comprising:
hollow chamber profiles including a first hollow chamber profile and a second hollow chamber profile which are connected to each other at an angle, each hollow chamber profile having at least two chambers arranged one above the other in a z-direction, and a mounting surface extending in an x-y plane and located on the upper side of the hollow chamber profiles in a common plane, wherein each hollow chamber profile has a sealing fillet following a longitudinal extension of the hollow chamber profile, the sealing fillet formed as a recess with a concave cross-sectional geometry introduced into the mounting surface of the hollow chamber profile for receiving a seal, wherein ends of the hollow chamber profiles are mitered to form miter joints in a first profile section which extends from the mounting surface over an entire extension of an uppermost chamber of the at least two chambers in the z-direction, with the miter joints of two adjoining hollow chamber profiles connected to each other, such that joint-end mouths of the sealing fillets of the two adjoining hollow chamber profiles adjoin each other, and wherein, in a second profile section which is located in the z-direction below the first profile section and adjoins the first profile section, an end face of the first hollow chamber profile extending in a y-z plane bears against a side face of the second hollow chamber profile extending in a x-z plane and is connected to the second hollow chamber profile.

2. The frame structure part of claim 1, wherein the sealing fillets are curved in a region of adjoining miter joints.

3. The frame structure part of claim 1, wherein each sealing fillet is laterally open at an outer side wall of the respective hollow chamber profile.

4. The frame structure part of claim 1, wherein a supporting leg is formed on each hollow chamber profile, and an end face of the supporting leg of the first hollow chamber profile adjoins a side face of the supporting leg of the second hollow chamber profile, whereby a cross section of each hollow chamber profile is L-shaped.

5. The frame structure part of claim 4, wherein a shoulder is integrally formed on each hollow chamber profile and/or the supporting leg of each hollow chamber profile, and an end face of the shoulder of the first hollow chamber profile adjoins a side face of the shoulder of the second hollow chamber profile and is connected thereto.

6. The frame structure part of claim 5, wherein the shoulder is a hollow chamber.

7. The frame structure part of claim 1, wherein each hollow chamber profile has a cover positioning extension projecting orthogonally from the mounting surface and aligned with an inner side wall of the hollow chamber profile, and the cover positioning extension is integrally formed on the mounting surface.

8. The frame structure part of claim 1, wherein the uppermost chamber is separated from another chamber located below in the z-direction by a web running in an x-y plane.

9. The frame structural part of claim 1, wherein the hollow chamber profiles of the frame structure part are extruded aluminum profiles.

10. The frame structure part of claim 1, wherein the frame structure part is part of the frame structure of the battery housing for accommodating one or more battery modules, the frame structure having a plurality of such frame structure parts.

11. A battery housing for an electric motor-driven vehicle, comprising: a cover, a base and a frame structure enclosing a battery module receptacle, the frame structure composed of frame structure parts according to claim 1, wherein the cover has a circumferential mounting flange which is supported in a contacting manner on the mounting surfaces of the frame structure parts of the frame structure, and wherein a circumferential seal is arranged in a circumferential sealing fillet formed by the sealing fillets of the frame structure parts of the frame structure.

12. The battery housing of claim 11, wherein the circumferential seal is a curable sealing compound which bonds the cover to the frame structure.

13. The battery housing of claim 11, wherein the sealing fillets of the frame structure parts, which form the circumferential sealing fillet, are inwardly curved in regions of adjoining miter joints.

14. The battery housing of claim 11, wherein the circumferential sealing fillet is laterally open at outer side walls of the hollow chamber profiles of the frame structure parts.

15. The battery housing of claim 11, wherein the uppermost chamber of each hollow chamber profile of the frame structure parts is separated from another chamber located below in the z-direction by a web running in an x-y plane.

16. The battery housing of claim 11, wherein the hollow chamber profiles of the frame structure part are extruded aluminum profiles.

17. The battery housing of claim 11, wherein:
the circumferential seal is a first circumferential seal,
each hollow chamber profile of the frame structure parts has a cover positioning extension projecting orthogonally from the mounting surface and aligned with an inner side wall of the hollow chamber profile, and the cover positioning extension is integrally formed on the mounting surface, and
the cover has, in a transition from a side wall of the cover into the mounting flange of the cover, a sealing fillet following the contour of the cover positioning extensions of the hollow chamber profiles, and a second circumferential seal is arranged in the sealing fillet of the cover.

18. The battery housing of claim 17, wherein the first and second circumferential seals are curable sealing compounds which bond the cover to the frame structure.

19. The battery housing of claim 11, wherein:
a supporting leg is formed on each hollow chamber profile of the frame structure parts, and an end face of the supporting leg of the first hollow chamber profile adjoins a side face of the supporting leg of the second hollow chamber profile, whereby a cross section of each hollow chamber profile is L-shaped,
a shoulder formed as a hollow chamber is integrally formed on each hollow chamber profile and/or the supporting leg of each hollow chamber profile, and an end face of the shoulder of the first hollow chamber profile adjoins a side face of the shoulder of the second hollow chamber profile and is connected thereto, and
the base is designed as a base plate which rests on the upper side of the supporting legs or the upper side of the shoulders, and the base plate is connected thereto in a media-tight manner.

* * * * *